United States Patent [19]

Dorinski et al.

[11] Patent Number: 5,104,754
[45] Date of Patent: Apr. 14, 1992

[54] WELDLESS BATTERY PACK

[75] Inventors: Dale W. Dorinski; Mark S. Bresin, both of Coral Springs; Stephen D. Hunt, Davie; Mac W. Branan, Jr., Fort Lauderdale; John A. Desantis, N. Lauderdale, all of Fla.

[73] Assignee: Motorola, Inc., Schaumburg, Ill.

[21] Appl. No.: 594,489

[22] Filed: Oct. 5, 1990

[51] Int. Cl.⁵ .............................. H01M 2/10
[52] U.S. Cl. ...................... 429/99; 429/100
[58] Field of Search .................. 429/96, 99, 100

[56] References Cited

U.S. PATENT DOCUMENTS

| | | |
|---|---|---|
| 1,487,428 | 3/1924 | Balderston . |
| 2,117,692 | 5/1938 | Atkins ........................ 429/99 X |
| 2,396,534 | 3/1946 | Rose ............................ 429/96 |
| 2,983,778 | 5/1961 | Munse .......................... 429/99 |
| 3,957,540 | 5/1976 | Mabuchi et al. ............... 429/99 |
| 4,129,194 | 12/1978 | Hammond et al. ........... 429/100 X |
| 4,205,121 | 5/1980 | Naitoh ......................... 429/99 |
| 4,604,799 | 8/1986 | Gurol . |
| 4,912,288 | 3/1990 | Atkinson et al. . |

Primary Examiner—Stephen Kalafut
Attorney, Agent, or Firm—Pablo Meles

[57] ABSTRACT

The present invention provides for a battery pack (50) comprising a plurality of cells (58) within a housing (52), each cell having a positive and negative terminals (57 and 59). The battery pack (50) further comprises molded-in circuitry means (54) on the surface of the housing (52) for providing interconnection between the plurality of cells (58). Optionally, the housing (52) further comprises molded-in or integral spring fingers (56). The spring fingers (56) are preferably biased toward the positive and negative terminals and provide at least some interconnection for the plurality of cells (58).

23 Claims, 4 Drawing Sheets

WELDLESS BATTERY PACK

TECHNICAL FIELD

This invention relates generally to battery cell packs, and more specifically to weldless battery packs.

BACKGROUND

Battery packs for portable devices such as two-way radios typically comprise a number of cells having contacts welded together all within a housing. The individual cells are interconnected using sheet metal tabs which are spot welded to the cell terminals. Usually, the interconnected cells are then spot welded to a flex circuit and subsequently inserted into a battery housing. This method of manufacture is wrought with inefficient assembly procedures and unnecessary parts and labor resulting in excessive manufacturing expense and comprised reliability.

Consumer loaded batteries for consumer electronics such as cameras, radios, CD players, etc., typically have spring loaded contacts on one end and metal contacts coupled to the opposite end of the primary cells. Consumer loaded battery packs do not require the extra circuitry typically found in battery packs. Battery packs for portable radios will usually include resistors, thermistors, diodes and other components that enable the battery packs to be rechargeable and/or instrinsically safe. Thus, consumer loaded battery compartments may only have stamped metal on the housing and electrical loss between battery cells and circuitry is of little concern in these applications. Therefore, a need exists for a battery pack that provides the convenience of consumer loaded battery packs and allows for greater efficiency and reduced cost in assembly and manufacture.

SUMMARY OF THE INVENTION

Accordingly, a battery pack comprises a plurality of cells within a housing, each cell having a positive and negative terminal. The battery pack further comprises molded-in circuitry means on the surface of the the housing for providing interconnection between the plurality of cells. Optionally, the housing further comprises molded-in or integral spring fingers. The spring fingers are preferably biased toward the positive and negative terminals and provide at least some interconnection for the plurality of cells.

DETAILED DESCRIPTION OF THE PREFERRED EMBODIMENT

Figure 1:
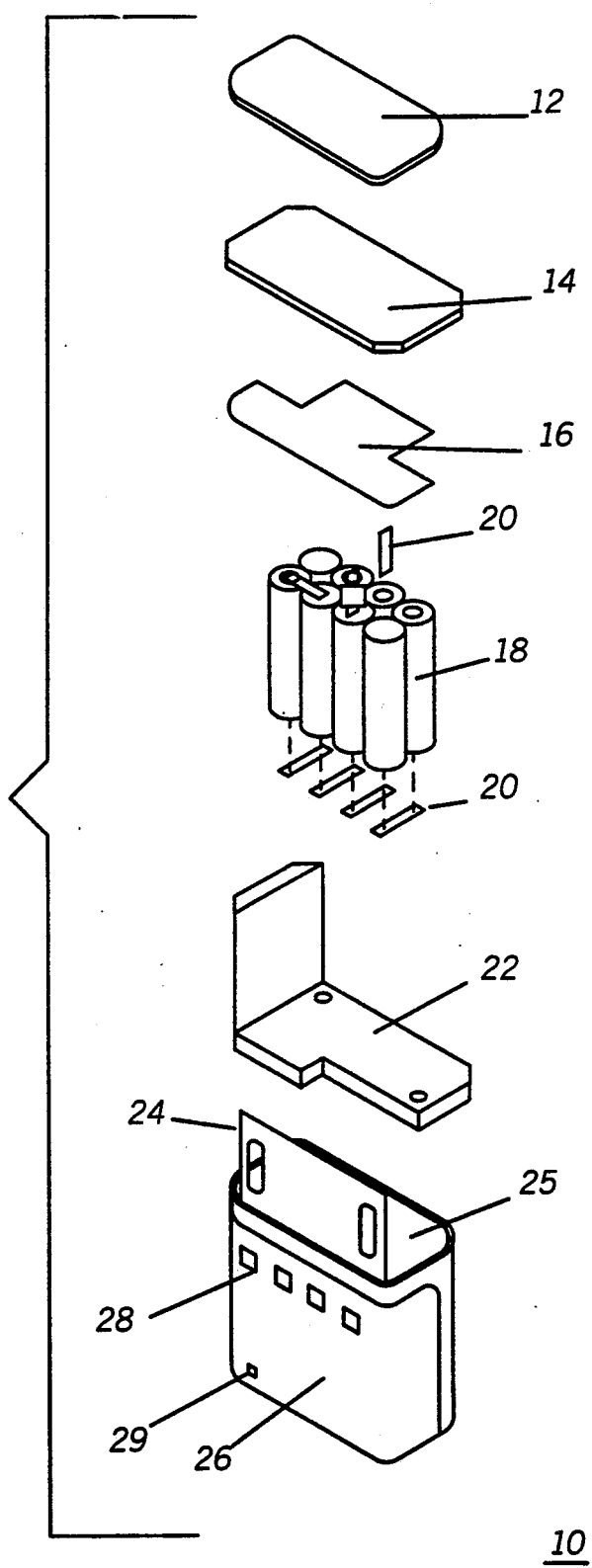
FIG. 1 is perspective view of a battery pack as is known in the art.

Referring to FIG. 1, there is shown a typical battery pack 10 as is known in the art. The battery pack 10 preferably comprises a battery housing 26 having an aperture 25. Within the aperture 25, a flex circuit 24 is inserted having charger contacts for inserting into apertures 28. The battery housing 26 may optionally have a ventilation hole 29 for release of gases generated from the battery chemistry. Shock pads 14 and 22 are used to dampen the movement of the cells 18 when the battery pack 10 is dropped or receives a sudden impact. The cells 18 have their respective adjacent positive and negative terminals connected together via steel tabs 20. The steel tabs are typically spot welded to the terminals and then welded or soldered to the contacts on the flex circuit 24. An insulator 16 is placed between the cells and the shock pad 14 to assist in preventing shorts between the cells. Finally, a housing cover 12 is placed on top of the shock pad 14 to seal the assembly 10.

Figure 2:
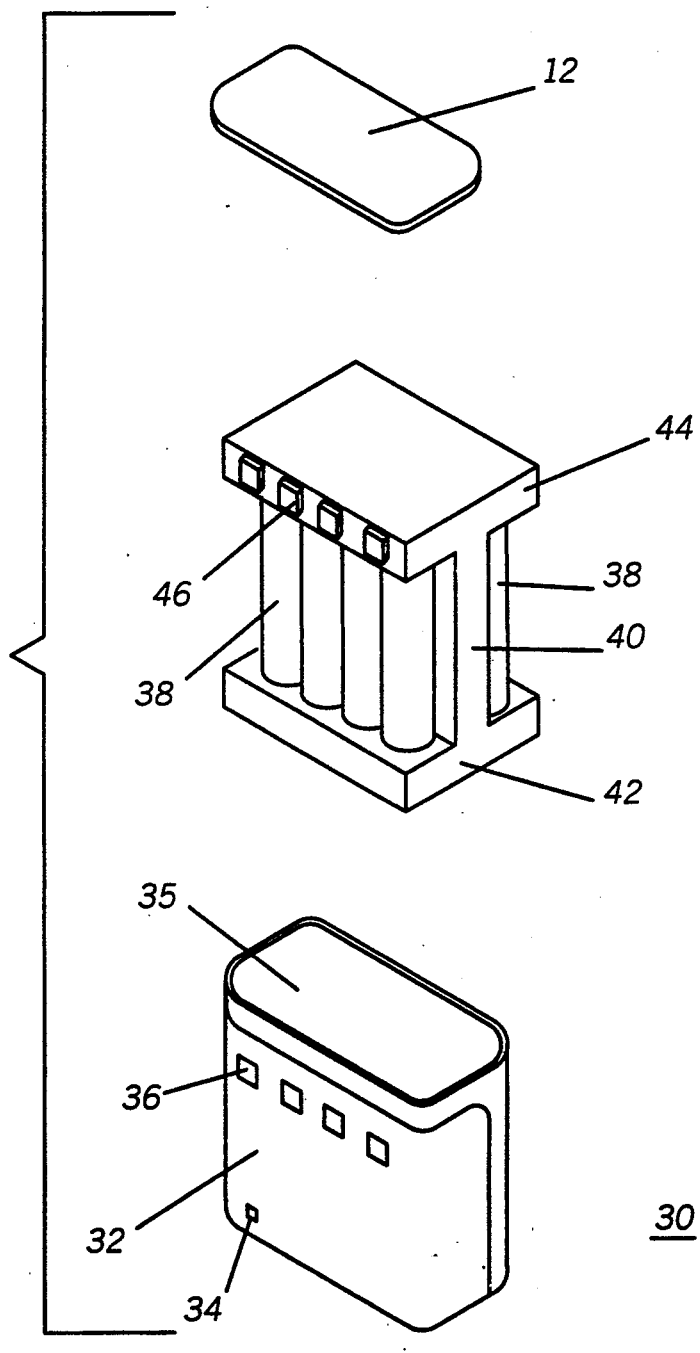
FIG. 2 is a perspective view of a battery pack in accordance with the present invention.

Referring to FIG. 2, there is shown a battery pack 30 arranged and constructed in accordance with the present invention. The battery pack 30 preferably comprises a housing 32 having an aperture 35 for receiving cells 38 and having apertures 36 serving as receptacles for charger contacts 46 molded in the I-beam frame 40. The battery housing 32 may optionally have a ventilation hole 34 for release of gases generated from the battery chemistry. I-beam frame 40 is arranged and constructed to retain cells 38 between an upper portion 44 and a lower portion 42. The I-beam frame is preferably made of a high temperature thermoplastic such as polyetherimide, polysulfone, polyethersulfone, polyetheretherketone, polycarbonate, polyimide, and blends of these materials. Other thermoplastics and thermosets may be utilized to realize similar results. The I-beam frame 40 preferably further comprises integrally molded circuitry to couple the cell terminals. The charger contacts 46 are preferably metallized plastic protrusions extending from the top portion 44. Methods of metallizing the protrusions are known to those skilled in the art. The cells can be retained in the I-beam frame 40 by using molded in or integral spring fingers (not shown) as seen in FIG. 3.

Figure 3:
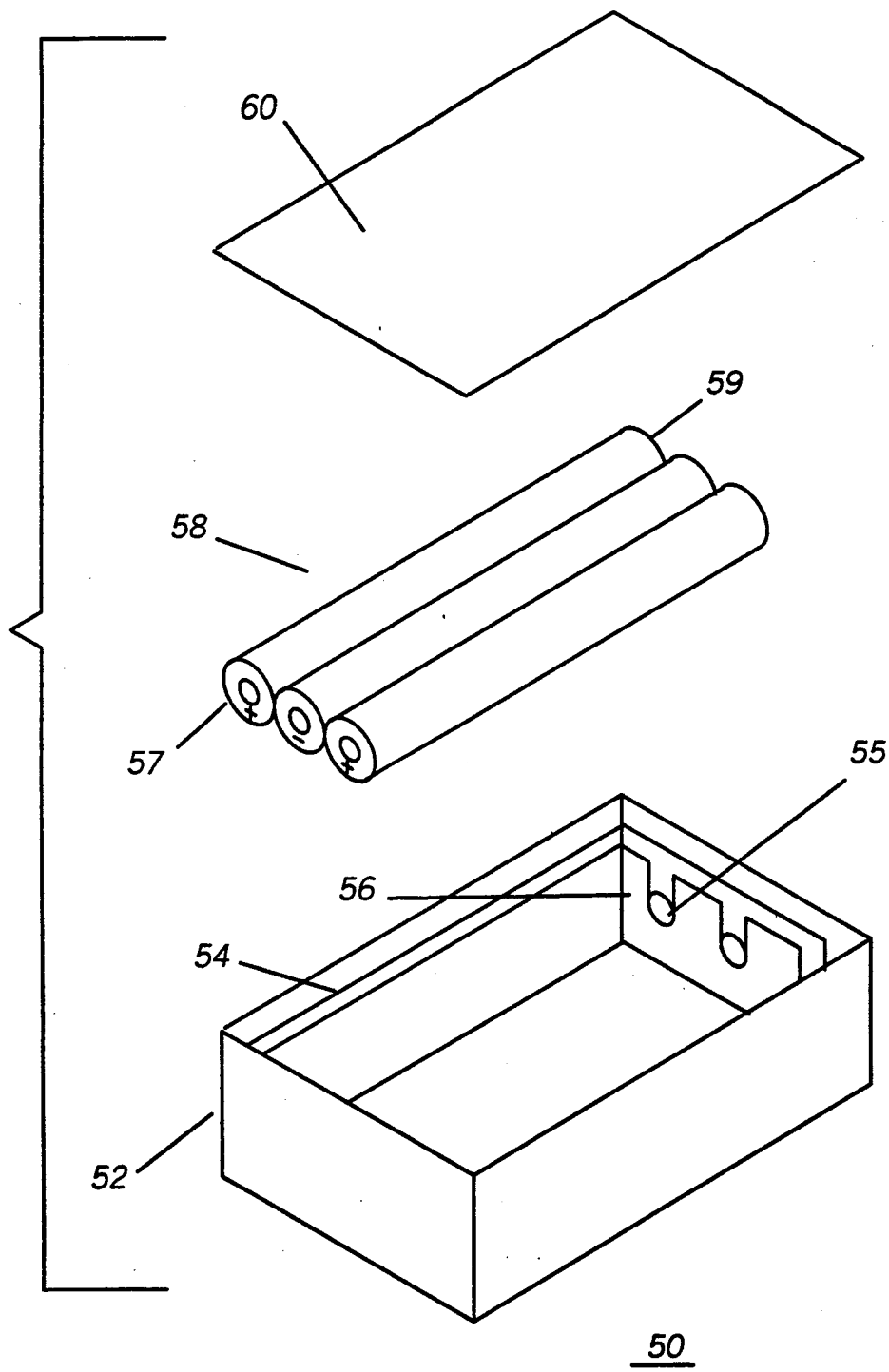
FIG. 3 is another perspective view of a battery pack in accordance with the present invention.

Referring to FIG. 3, a battery pack 50 comprises a housing 52 having molded-in circuitry 54. The housing 52 and circuitry 54 are preferably made by one or two shot molding techniques as is known in the art. The molded-in or integral circuitry 54 couples to integral spring fingers 56 that biases the spring finger contacts 55 towards the terminals (57 and 59) of the battery cells 58. Once the batteries 58 are inserted in the battery housing 52 in the proper orientation, a housing cover 60 is used to seal the battery pack 50. Optionally, charger and battery contacts could be coupled to the molded in circuitry using metal filled through holes or other means known in the art.

Figure 4:
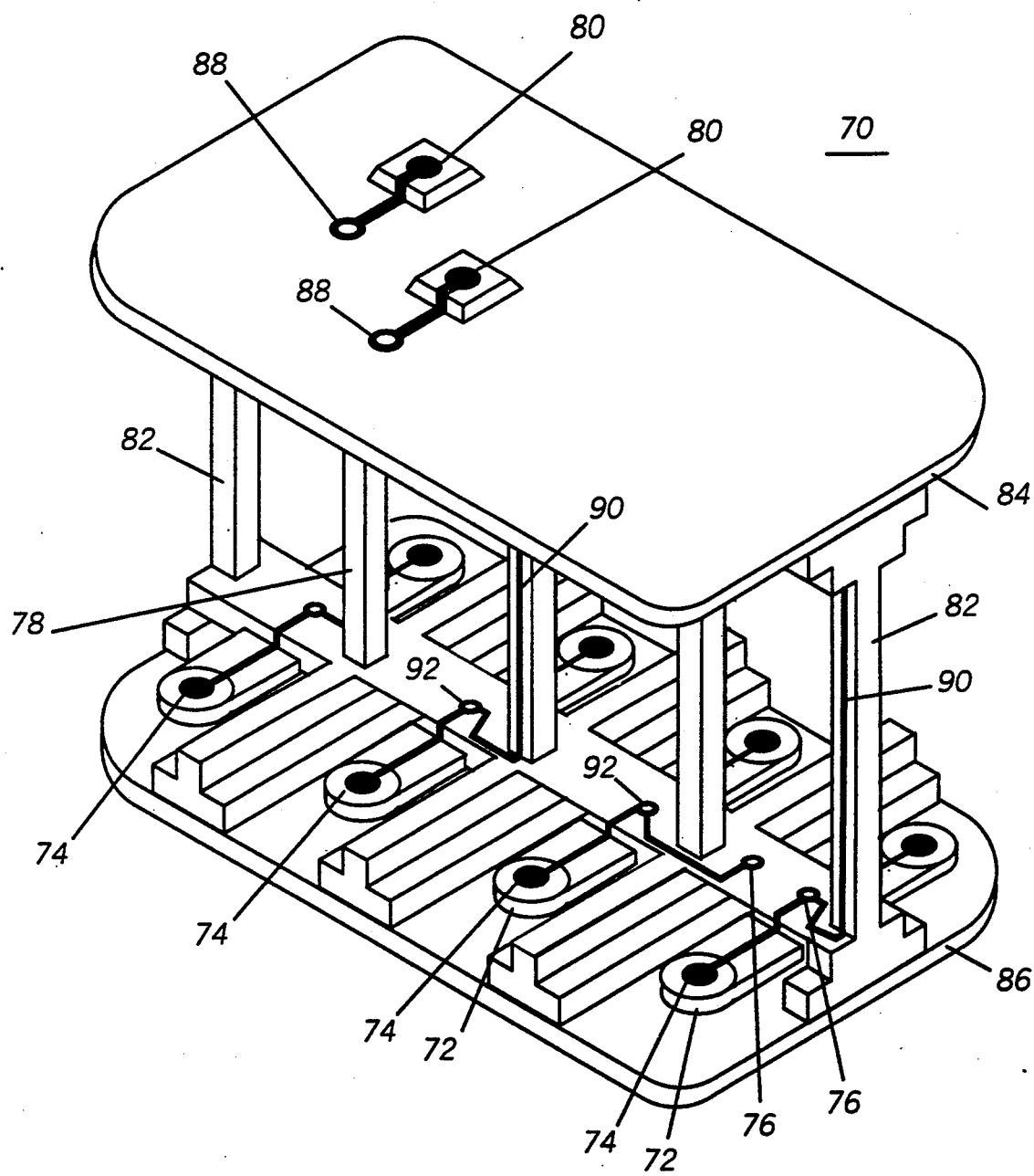
FIG. 4 is perspective view of an I-beam structure for use in an embodiment of the present invention.

Referring to FIG. 4, a multiple I-beam frame 70 comprises a top substrate 84 and a bottom substrate 86 coupled by I-beam structures 78 and end beams 82. On the bottom surface of the top substrate 84 (not shown) and the top surface of the bottom substrate 86, molded-in or integral metallized spring fingers 72 are preferably located. Optionally, the spring fingers 72 may be located on the bottom or top substrate alone. The spring finger 72 preferably includes another metallization layer 74 to insure sufficient contact force with the terminals of the cells (not shown) to be inserted between the top and bottom substrates. Integral metallization (90) couples pairs of terminals together and preferably provides interconnections for componentry such as diodes, resistors and capacitors where needed. The components are placed in metallized through holes 76 for example. Metallized through holes 88 and 92 are used to interconnect terminals and other components if desired. Finally, metallized contacts 80 serve as the charger contacts. Likewise, charger contacts are provided in a similar fashion. The molded-in or integral metallization is preferably made using double-shot molding, but other means of providing interconnections on or in the I-beam structures, battery pack housing, or portable product housing is within contemplation of the present invention.

In order to assemble the battery pack 10 of FIG. 1, approximately 70 operations are needed in approximately 585 seconds. On the other hand, the battery pack 30 of FIG. 2 merely requires approximately 13 operations to assemble in approximately 50 seconds. This is a tremendous savings in labor and parts. In FIG. 3, the battery pack 50 can be assembled in the same time a consumer inserts batteries into their consumer electronic products. Additionally, this assembly can easily be adapted for robotic assembly.

What is claimed is:

1. A battery pack, comprising:
    a housing;
    a plurality of cells within said housing, each cell having a positive and negative terminal; and
    integral molded in circuitry on the surface of said housing for providing interconnection between said plurality of cells.

2. The battery pack of claim 1, wherein the integral molded in circuitry further comprises battery contacts for providing power to a detachable electric device.

3. The battery pack of claim 1, wherein said integral molded in circuitry comprises integrally molded in spring fingers, said spring fingers being biased toward said positive and negative terminals and providing the interconnection for said plurality of cells, said spring fingers further being of the same material as said housing.

4. The battery pack of claim 1, wherein the integral molded in circuitry further comprises charger contacts for recharging said plurality of cells.

5. The battery pack of claim 1, wherein the integral molded in circuitry means further comprises battery contacts for providing power to a portable electronic device and charger contacts for recharging said plurality of cells.

6. The battery pack of claim 1, wherein said battery pack couples to a radio.

7. The battery pack of claim 1, wherein the integral molded in circuitry comprises a flex circuit.

8. A battery pack, comprising:
    a housing;
    a plurality of cells, each cell having a positive and negative terminal and being interconnected by integral molded in circuitry within said housing; and
    means for retaining said interconnected cells in said housing, said means including integral spring fingers being biased toward said positive and negative terminals and providing the interconnection for said plurality of cells.

9. The battery pack of claim 8, wherein the plurality of cells are arranged and constructed to have alternating positive and negative terminals adjacent to one another.

10. The battery pack of claim 8, wherein the means for retaining comprises a lid for enclosing the battery pack.

11. The battery pack of claim 10, wherein the means for retaining further comprises a flex circuit.

12. The battery pack of claim 8, wherein the means for retaining comprises an I-beam structure having integral molded-in circuitry and integral molded-in spring-fingers for locating and interconnecting said plurality of cells.

13. The battery pack of claim 12, wherein the I-beam structure further comprises metallized protrusions coupled to the integral molded-in circuitry for providing battery contacts.

14. The battery pack of claim 12, wherein the I-beam structure further comprises metallized protrusions coupled to the integral molded-in circuitry for providing charger contacts.

15. The battery pack of claim 12, wherein the I-beam structure further comprises metallized protrusions coupled to the integral molded-in circuitry for providing battery contacts and charger contacts.

16. The battery pack of claim 12, wherein the battery couples to a radio.

17. The battery pack of claim 12, wherein the I-beam structure is made of a high temperature thermoplastic selected from a group consisting of polyetherimide, polysulfone, polyethersulfone, polyetheretherketone, polycarbonate, polyimide, and blends of these materials.

18. The battery pack of claim 12, wherein the I-beam structure is made of a thermoset material.

19. A battery pack, comprising:
    a housing
    a plurality of cells within said housing, each cell having a positive and negative terminal; and
    a circuit disposed on the surface of said housing including integrally molded in spring fingers, said spring fingers being biased toward said positive and negative terminals and providing at least some interconnection for said plurality of cells, said integrally molded in spring fingers further being of the same material as said housing.

20. The battery pack of claim 19, wherein the circuit disposed on said housing further comprises battery contacts for providing power to a detachable electric device.

21. The battery pack of claim 1, wherein the circuit disposed on said housing further comprises charger contacts for recharging said plurality of cells.

22. The battery pack of claim 1, wherein the circuit disposed on said housing further comprises battery contacts for providing power to a portable electronic device and charger contacts for recharging said plurality of cells.

23. The battery pack of claim 1, wherein said battery pack couples to a radio.

* * * * *